United States Patent [19]

Scarzello

[11] Patent Number: 5,484,369
[45] Date of Patent: Jan. 16, 1996

[54] MACHINE TOOL WITH A DYNAMIC TOOL MAGAZINE

[75] Inventor: Osvaldo Scarzello, Torino, Italy

[73] Assignee: Comau S.p.A., Grugliasco, Italy

[21] Appl. No.: 314,266

[22] Filed: Sep. 30, 1994

[30] Foreign Application Priority Data

Oct. 13, 1993 [IT] Italy .................. TO93A0748

[51] Int. Cl.⁶ .................................. B23Q 3/157
[52] U.S. Cl. ........................................ 483/56
[58] Field of Search ................ 483/55, 56, 69, 483/30, 64, 25, 67; 409/131, 190

[56] References Cited

U.S. PATENT DOCUMENTS

| | | | |
|---|---|---|---|
| 3,688,362 | 9/1972 | Durr et al. | 483/67 X |
| 4,012,818 | 3/1977 | Dornbluth et al. | 483/55 X |
| 4,620,347 | 11/1986 | Stark et al. | 423/56 |
| 4,621,407 | 11/1986 | Suzuki | 483/56 |
| 4,700,453 | 10/1987 | Strate et al. | 483/25 X |
| 5,376,062 | 12/1994 | Zeichner | 483/55 |

FOREIGN PATENT DOCUMENTS

| | | | |
|---|---|---|---|
| 0072865 | 3/1983 | European Pat. Off. | |
| 152081 | 8/1985 | European Pat. Off. | 409/190 |
| 517168 | 12/1992 | European Pat. Off. | 409/137 |
| 2668730 | 5/1992 | France. | |
| 8809047 | 11/1989 | Germany. | |
| 62-002935 | 12/1980 | Japan. | |
| 61-144 | 5/1986 | Japan | 483/56 |
| 312038 | 12/1988 | Japan | 483/56 |
| 156142 | 9/1992 | Japan | 483/56 |
| 673607 | 3/1990 | Switzerland | 483/56 |
| 1296357 | 3/1987 | U.S.S.R. | 483/56 |
| 8202848 | 9/1982 | WIPO | 483/55 |

*Primary Examiner*—William Briggs
*Attorney, Agent, or Firm*—Sughrue, Mion, Zinn, Macpeak & Seas

[57] ABSTRACT

A high speed production unit for performing machining operations, has a first horizontal slide, a second slide slidable horizontally along a direction orthogonal to the sliding direction of the first slide and a third vertically sliding slide carrying a tool head. In addition to a static tool magazine, the unit has a dynamic tool magazine which is displaceable between an operative position adjacent to the working area of the tool head and an inoperative position spaced apart from said working area for replacement of broken or worn tools without any loss in cycle time.

5 Claims, 4 Drawing Sheets

MACHINE TOOL WITH A DYNAMIC TOOL MAGAZINE

BACKGROUND OF THE INVENTION

The present invention relates to an improvement of a high speed production unit for performing machining operations which has been disclosed in Italian patent application TO91U000132 of the Applicant, as well as in the corresponding European patent application EP-0 517 168.

The above identified references disclose a high speed production unit for performing machining operations which is being presently produced and marketed by the Applicant and comprises:

a bed, a first slide, slidably mounted along a first horizontal axis on said bed, a second slide, slidably mounted on said first slide along a second horizontal axis orthogonal to said first horizontal axis, said second slide having a lower sliding plane which is inclined at an angle lower than 90° with respect to the horizontal plane, and a third slide slidably mounted along a third vertical axis on said second slide and carrying a tool head, a tool magazine for the tool head having a support body provided with means for supporting a plurality of tools each provided with means for quick coupling to said tool head; said support body being static with respect to said bed; said head being adapted to pick up and store tools in said static magazine in order to perform the various operations of a machining cycle on a piece to be machined.

Due to the above described inclined arrangement of the sliding plane of the second slide, a lower stress of the cooperating slide-ways is obtained along with the resulting possibility of a more rapid displacement of the movable masses, with advantage for the production speed.

During machining of a piece, the tool head provides by itself to store and pick up tools in said static magazine, so that it can perform all the machining operations programmed on a given piece. However, when a tool in the static magazine reaches the end of its life because of wear or rupture, it must be replaced, which can be done by stopping the machine, with a resulting loss in time.

The details relating to the structure of the known production unit which has been mentioned above and the advantages thereof are not disclosed herein, since they are described in the above identified Italian application and in the parallel European patent application of the same Applicant, whose contents is incorporated herein by reference.

SUMMARY OF THE INVENTION

The object of the present invention is that of further improving the production which has been previously proposed by the Applicant, allowing for replacement of broken or worn tools without any loss in cycle time.

In order to achieve this object, the production unit forming the subject of the present invention is characterized in that it is provided with a dynamic tool magazine for the tool head, said dynamic magazine having a support body provided with means for supporting a plurality of tools which are each provided with means for quick coupling to said tool head, and in that said support body of the dynamic magazine is displaceable between an operative position, in which it is adjacent to the working area of the tool head, so as to allow for a broken or worn tool to be discharged by the tool head into the dynamic magazine and a new tool provided at the dynamic magazine to be picked up by the tool head, and an inoperative position, in which said body is spaced apart from the working area of the tool head, so as to allow a replacement of broken or worn tools (13) without any interference with the working cycle of the tool head (10).

Due to the above indicated features, the production unit according to the invention is able to replace automatically the tools which have reached the end of their life without any loss in cycle time. When the tool carried by the tool head is in said condition, the head stores the tool, rather than into the static magazine, into the dynamic magazine, after that the latter has been brought into its operative position, and picks up a new tool also provided in the dynamic magazine, whereupon the latter may be brought again into its inoperative position. At the end of the machining operation with said new tool, the head may store this tool into the static magazine, all the above operations being performed without any loss in cycle time.

DESCRIPTION OF THE DRAWINGS

Further features and advantages of the production unit according to the invention will become apparent from the description which follows with reference to the annexed drawings, given purely by way of non limiting example, in which.

DETAILED DESCRIPTION OF THE INVENTION

Figure 1:
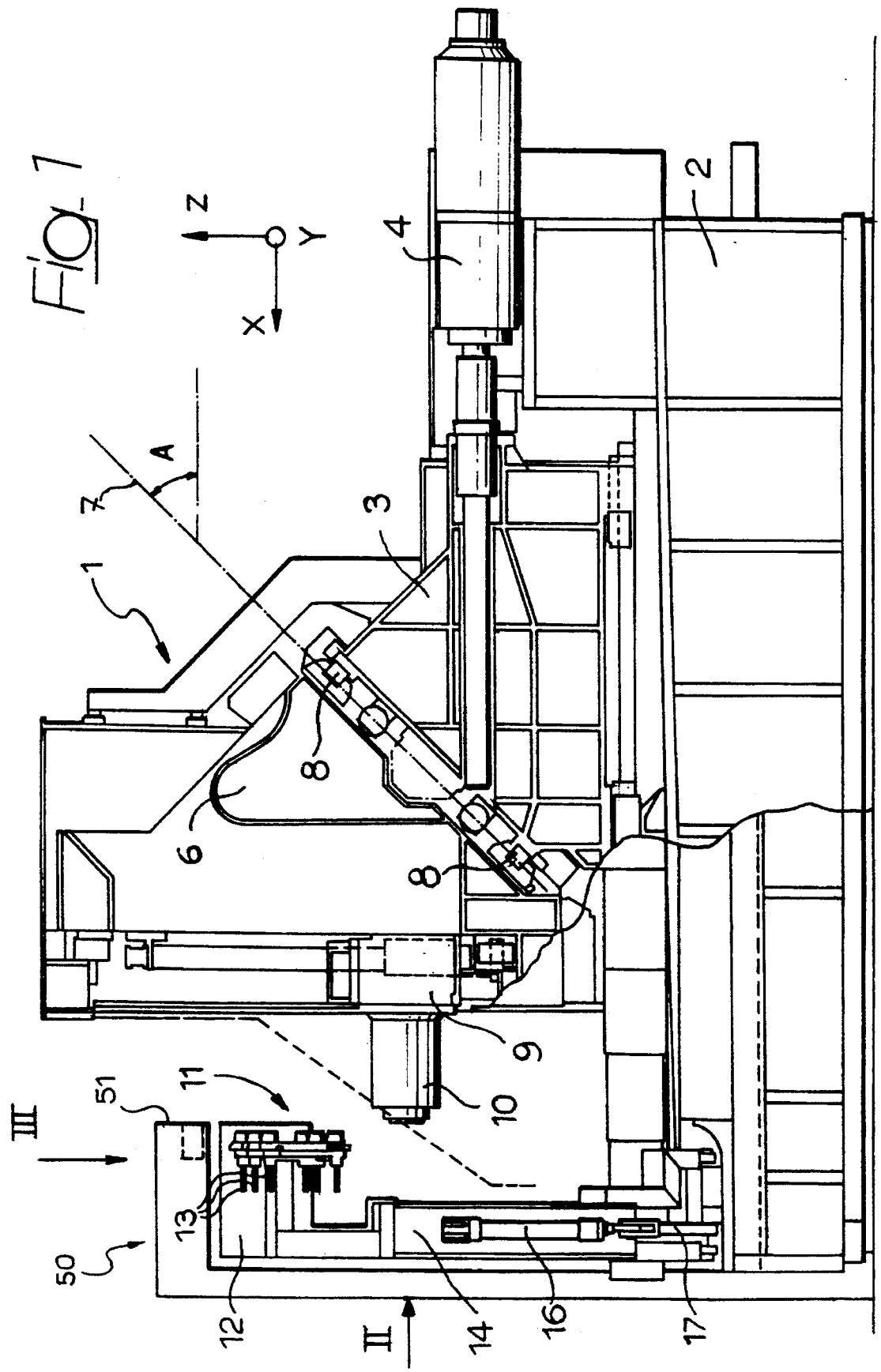
FIG. 1 is a side elevational view, partially in cross section, of a production unit according to the invention.

In the following, the overall structure of the production unit will be disclosed only generally, since the details of construction and the operation of this production unit are disclosed in Italian application TO91U000132 and in the corresponding European patent application EP 0 517 168 of the Applicant, whose contents is incorporated herein by reference.

In the drawings, reference numeral 1 generally designates a high speed production unit for performing machining operations, comprising a bed 2. A first slide 3 is slidably mounted on bed 2 along a first horizontal axis X and is driven by a motor unit 4 which is spaced apart upwardly with respect to the lower sliding plane of slide 3, defined by slide-ways 5 (FIG. 4) provided on bed 2.

Reference numeral 6 designates a second slide which is slidably mounted on the first slide 3 along a second horizontal axis Y which is orthogonal to said first axis X. Slide 6 has a lower sliding plane 7, defining by the slide-ways 8 provided on slide 3, which is inclined at an angle A lower than 90° and preferably is of 45° with respect to the horizontal plane.

A third slide 9 is slidably mounted on the second slide 6 along a vertical axis Z and carries a tool head 10.

As it has been indicated already, the details of construction of the bed and the slides 3, 6, 9, as well as their operating features are not illustrated herein, since they are apparent from the above identified previous applications of the same Applicant.

Although this is not described in the above mentioned prior applications, the unit which has been already produced and marketed by the Applicant is also provided with a static magazine 50 for the various tools 13 which are to perform the various operations foreseen by the machining cycle of a given piece. The static magazine 50 has a structure 51 provided with means of any known type (for example with clamp means or resilient jaws) to support tools 13. During machining, the head 10 is able by itself to store and pick up tools in the static magazine 50 (which can be provided with a sliding door 52 driven by a fluid cylinder 53) to perform the programmed machining cycle.

According to the invention, the above described production unit is further provided with a tool dynamic magazine 11 including a support body 12 provided with a plurality of seats which are to receive several tools 13. The support body 12 is provided with means of any known type, for example clamp means or resilient jaws, to hold the tools in their seats. Also the details of construction relating to this tool holding means are not illustrated, since, as already indicated, such means may be of any known type, and their structure, taken alone, does not fall within the scope of the present invention. Furthermore, the deletion of these details from the drawings renders the latter easier to be understood.

Figure 2:
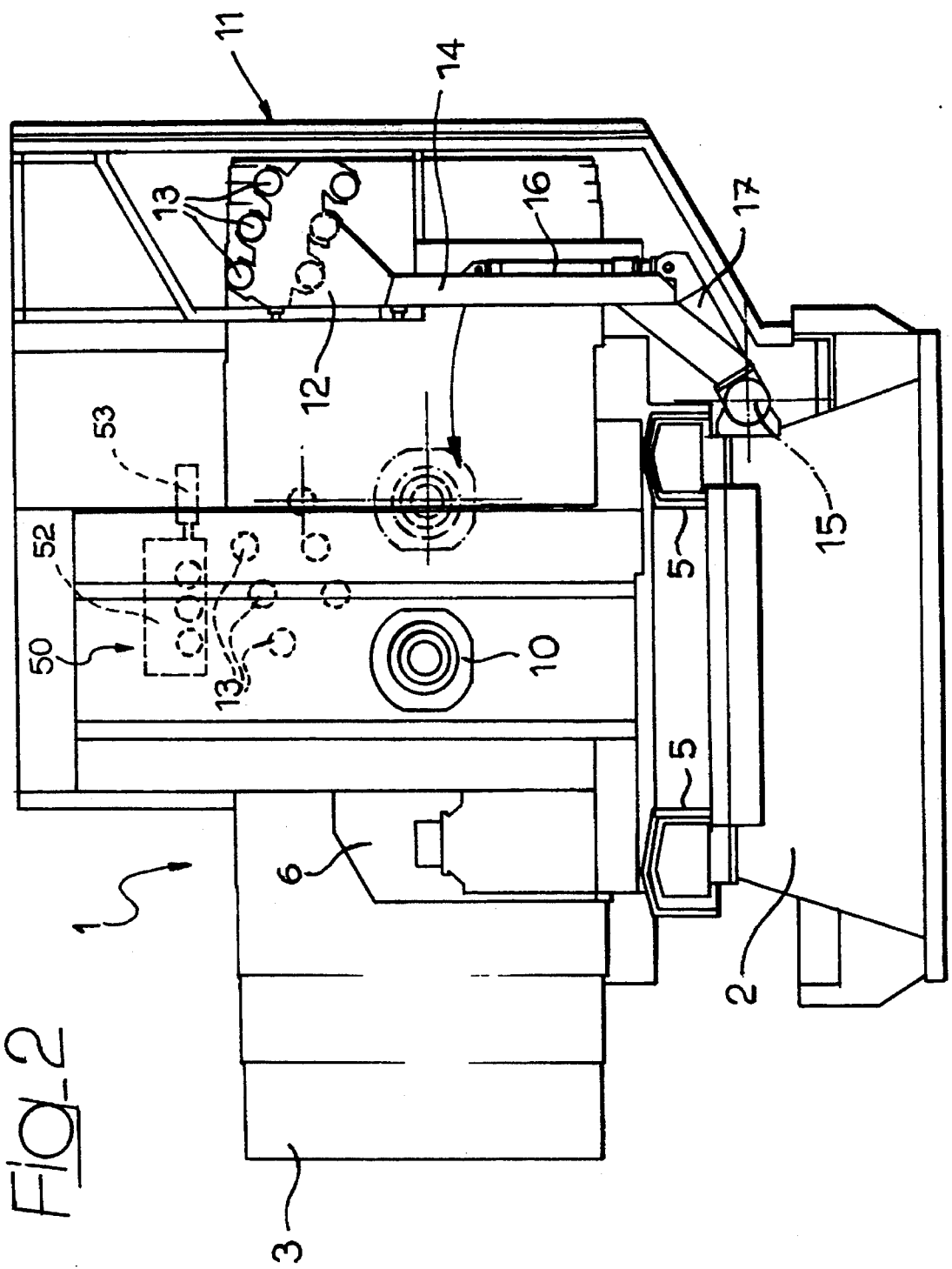
FIG. 2 is a front view according to arrow II of FIG. 1.
Figure 3:
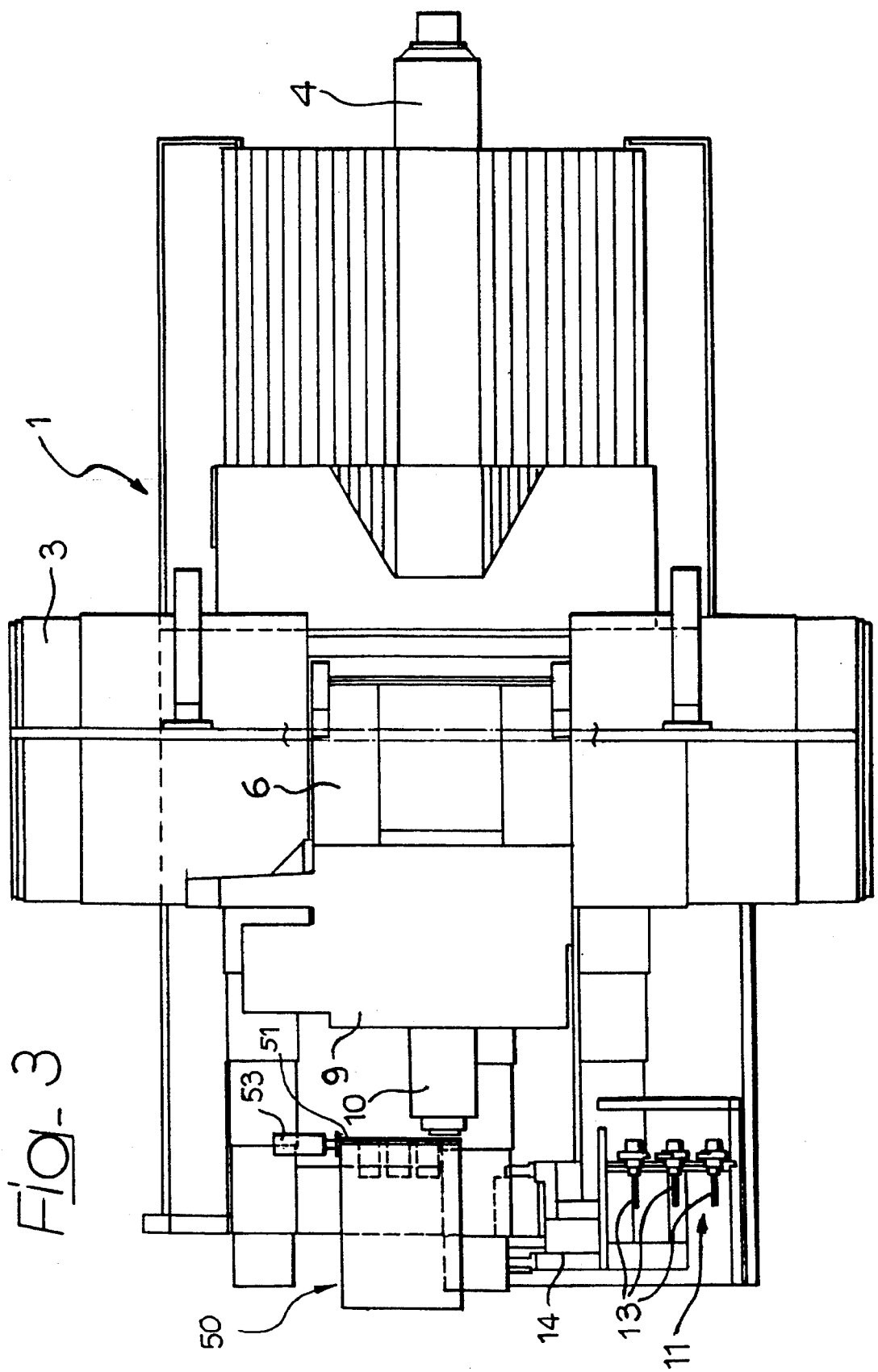
FIG. 3 is a plan view according to arrow III of FIG. 1.
Figure 4:
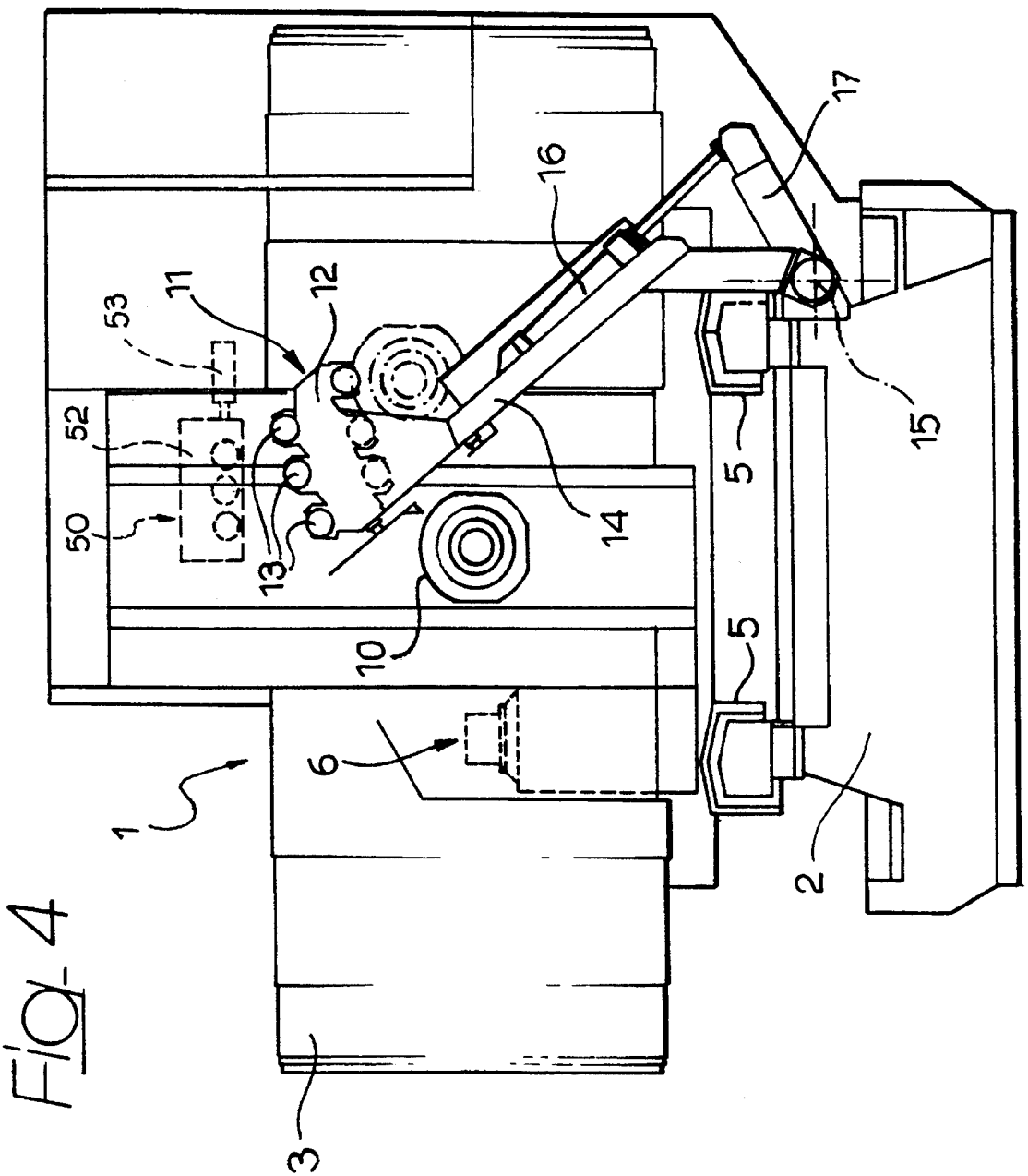
FIG. 4 is a view corresponding to that of figure 2 which shows the production unit in different operative condition.

As shown in the drawings, and particularly in FIGS. 2 and 4, the support body 12 of magazine 11 is fixed to the end of a beam 14 which is pivotally mounted on bed 2 around a horizontal axis 15. The pivotal movement of beam 14 may be driven by a fluid cylinder 16 interposed between beam 14 and a fixed bracket 17 connected to bed 2, so that the body 12 may be displaced between the operative position shown in FIG. 4 and the inoperative position shown in figure 2.

When magazine 11 is in its operative position shown in FIG. 4, the tools 13 are adjacent to the working area of the tool head 10. In this condition, the slides of the productions unit may be driven so as to bring the tool head 10 in a position in which it faces an empty tool seat of magazine 11, so that the tool previously mounted on head 10 may be automatically stored in magazine 11. Immediately thereafter, the tool head 10 may be brought in front of a tool 13 provided in magazine 11, so that the tool may be picked up by the tool head. Once this operation has been performed, magazine 11 may be brought back into its inoperative position shown in FIG. 2.

As already illustrated, during operation of the machine the head makes only use of the static magazine 50 as far as the tools are in an efficient condition. When the tool carried at a given time by the head is broken or reaches anyway the end of its life, it is discharged, rather than into the static magazine, into the dynamic magazine, once the latter has been brought into its operative position. The dynamic magazine is also provided with a new tool of the same type which may be picked up by the head. At this time, magazine 11 may go back into its inoperative position and head 10 may start working again, without any need to stop the machine, whereas the broken tool is discharged by magazine 11 without any interference with the machining operation. For this reason, the dynamic magazine 11 has preferably a number of seats which is twice that of the static magazine, one half of these seats being occupied with a set of new tools, and the other half being empty. Naturally, while the principle of the invention remains the same, the details of construction and the embodiments may widely vary with respect to what has been described and illustrated purely by way of example, without departing from the scope of the present invention.

What is claimed is:

1. High speed production unit for performing machining operations, comprising a bed, a first slide slidably mounted along a first horizontal axis on said bed, a second slide slidably mounted on said first slide along a second horizontal axis orthogonal to said first horizontal axis, said second slide having a lower sliding plane inclined at an angle lower than 90° with respect to the horizontal plane, a third slide slidably mounted along a third vertical axis on said second slide and carrying a tool head, a tool magazine for the tool head having a support body provided with means for supporting a plurality of tools each provided with means for quick coupling to said tool head, said support body being static with respect to said bed; said head being adapted to pick up and store tools in said static magazine in order to provide for the different operations of a machining cycle programmed on a given piece to be machined, wherein said production unit is provided with an auxiliary dynamic tool magazine for the tool head, said dynamic magazine having a support body provided with means for supporting a plurality of tools each provided with means for quick coupling to said tool head, and wherein said body of said dynamic magazine is displaceable between an operative position, in which it is adjacent to the working area of said tool head, so as to allow for a broken or worn tool to be discharged by the tool head into the dynamic magazine and a new tool provided at the dynamic magazine to be picked up by the tool head, and an inoperative position, in which said body of said dynamic magazine is spaced apart from working area of the tool head, so as to allow for replacement of broken or worn tools without any interference with the machining cycle of the tool head.

2. Production unit according to claim 1, wherein said support body of the dynamic magazine is placed at one end of a beam which is pivotally mounted on bed of the production unit between said two operative and inoperative positions.

3. Production unit according to claim 2, wherein a fluid cylinder is interposed between said beam and the bed to drive the pivotal movement of said beam between its operative and inoperative positions.

4. Production unit according to claim 2, wherein the pivot axis of said beam which carries the support body of the dynamic magazine is parallel to said first horizontal axis and said beam is mounted at one end of the bed on one side of the working area of the tool head.

5. Production unit according to claim 1, wherein the dynamic magazine has a number of seats for the tools which is at least twice the number of seats provided in the static magazine.

* * * * *